Oct. 4, 1938.  W. R. FREEMAN  2,131,944
CLUTCH AND BRAKE CONTROL MECHANISM
Filed May 6, 1937  2 Sheets-Sheet 1
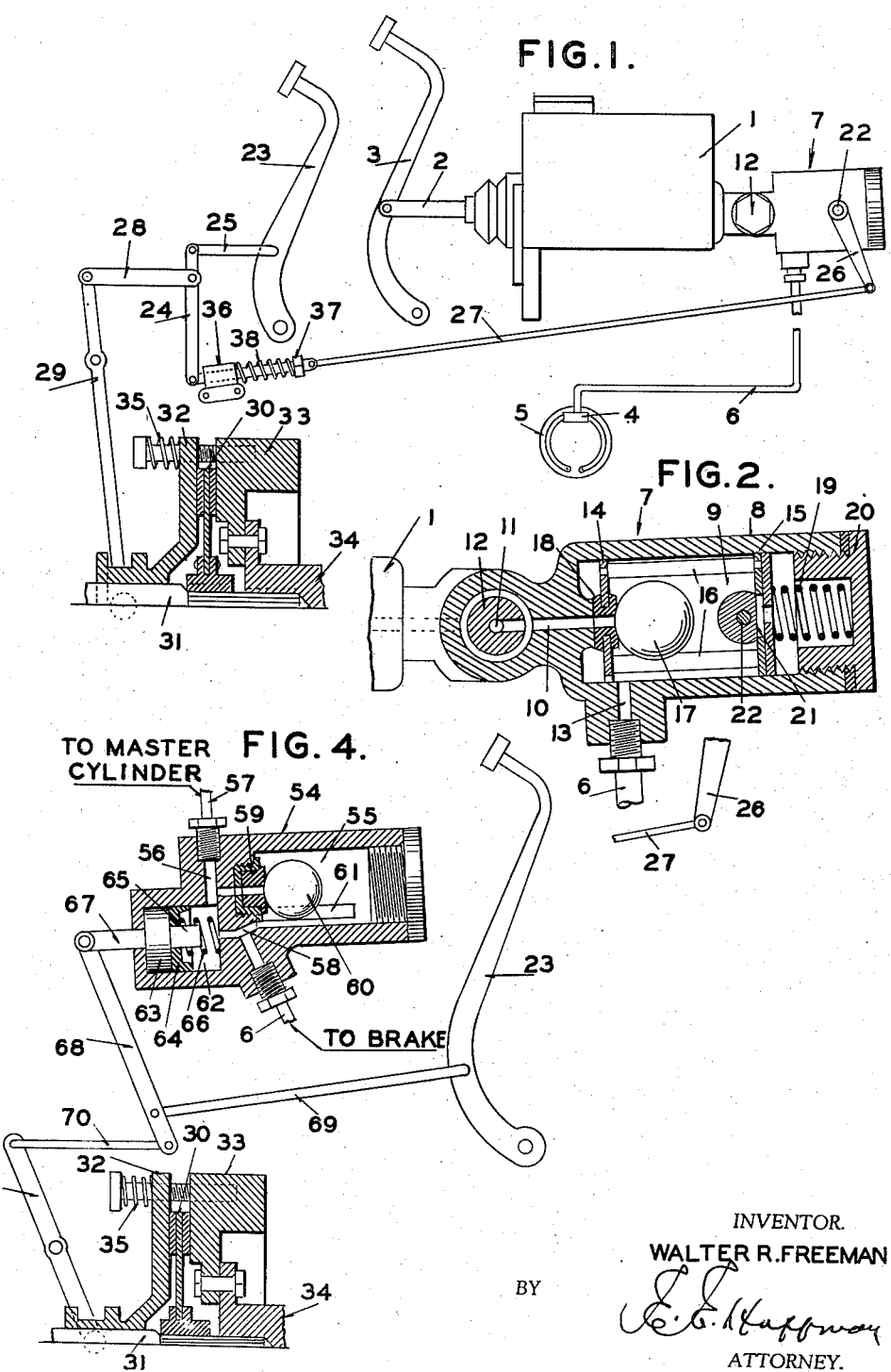
INVENTOR.
WALTER R. FREEMAN
BY
ATTORNEY.

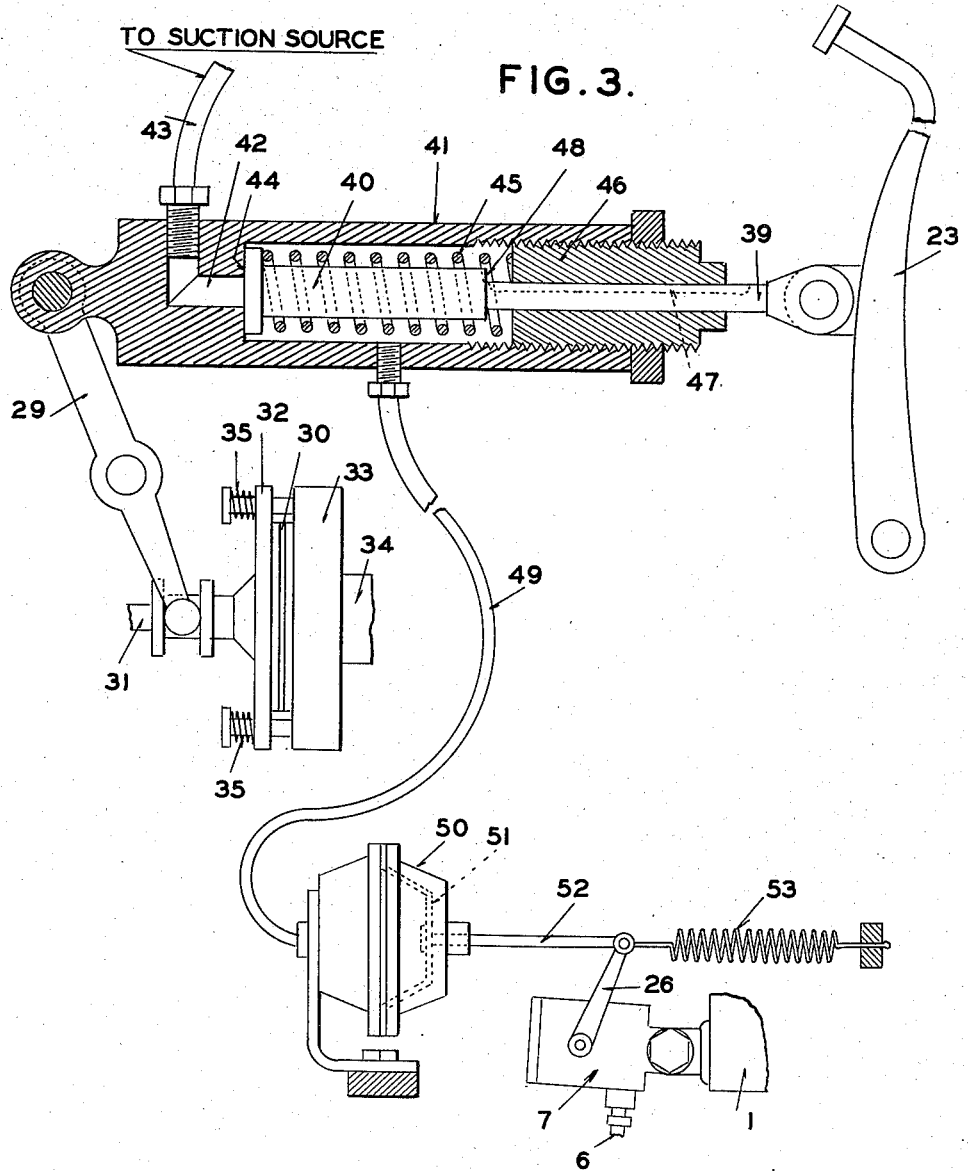

Patented Oct. 4, 1938

2,131,944

UNITED STATES PATENT OFFICE 2,131,944

CLUTCH AND BRAKE CONTROL MECHANISM

Walter R. Freeman, University City, Mo., assignor to Wagner Electric Corporation, St. Louis, Mo., a corporation of Delaware Application May 6, 1937, Serial No. 141,017

17 Claims. (Cl. 192—13)

My invention relates to improvements in means for preventing release of the brakes of a vehicle from an applied position when the clutch is disengaged, thus making it unnecessary for the vehicle operator to hold his foot on the brake pedal to keep the brakes applied.

One of the objects of my invention is to so control the brake release preventing means by the connection between the clutch pedal or its equivalent and the movable element of the clutch that the release preventing means will always be caused to be inoperative after the contact of the clutch elements during re-engagement of the clutch and notwithstanding wear of the clutch elements.

A more specific object of my invention is to control the brake release preventing means by the relative movement of two members forming the connection between the clutch pedal and the movable element of the clutch.

Another object of my invention is to so embody a release valve in a holding mechanism for fluid brakes and to so control this release valve by the clutch mechanism that the clutch engaging springs will be effective to cause it to act as a pressure limiting valve for limiting the amount of fluid pressure maintained in the braking system when the holding mechanism is effective.

Other objects of my invention will become apparent from the following description taken in connection with the accompanying drawings in which Figure 1 is a schematic view of a clutch mechanism and a brake mechanism with which my invention is associated, the clutch mechanism being shown in clutch-engaged position; Figure 2 is cross-sectional view of the control valve for preventing release of the brakes, the valve being shown in operative position as determined by the disengagement of the clutch; Figure 3 is a schematic view of a modified construction in which the release preventing valve is actuated by a suction motor; and Figure 4 is a schematic view of another modified construction embodying means for limiting the pressure with which the brakes are held applied.

Referring to Figures 1 and 2, the hydraulic braking system illustrated comprises a brake pedal 3 and a piston rod 2 for actuating the piston (not shown) of the master cylinder device 1 connected to the fluid motor 4 of the brake assembly 5 (one only being shown) through the conduit 6. The conduit is provided with a brake release preventing or control valve mechanism 7 carried by the end of the master cylinder whereby fluid under pressure may be maintained in the fluid motor to hold the brakes applied under certain conditions. The control valve mechanism illustrated by way of example is similar to that shown in Figure 6 of my Patent No. 2,030,288, issued February 11, 1936. Briefly described, this mechanism comprises a casing 8 having a chamber 9 therein communicating with the master cylinder by means of passages 10 and 11 through the attaching bolt 12 and also communicating with conduit 6 by a port 13. Within the chamber is a cage formed by end plates 14 and 15 and interconnecting rods 16, the lower two (one only being shown in Figure 2) of which form a track for a ball 17. The end plate 14 carries an annular rubber valve seat 18 which is adapted to engage with the end wall of the chamber surrounding the open end of passage 10 under the action of a spring 19 interposed between end plate 15 and a closure plug 20. The cage is moved in the chamber to unseat the valve seat 18 by a cam 21 secured to a cross shaft 22 extending to the exterior of the casing. The casing is so attached to the master cylinder that the track formed by the lower rods 16 will be at a slight angle to the roadway on which the vehicle is positioned, thus insuring that the ball will be against seat 18 when the vehicle is on either a horizontal roadway or facing upward on an inclined roadway.

In accordance with my invention, I control the valve mechanism 7 by the clutch actuating mechanism of the vehicle. The clutch pedal 23 is shown as connected to one end of a lever 24 by a link 25 and the other end of this lever is connected to the arm 26 on the cage operating shaft by means of a rod 27. A link 28 connects the intermediate portion of lever 24 to the clutch operating lever 29. The clutch is of the usual type comprising a clutch plate 30 on the driven shaft 31 and adapted to be frictionally gripped between a pair of clutch elements 32 and 33 carried by the driving shaft 34. The element 32 is axially movable relative to element 33 and against the clutch engaging springs 35 (one only being shown) in order to permit disengagement of the clutch by clutch lever 29. A fixed guide and stop 36 is employed for cooperation with a shoulder 37 on rod 27 to provide a fulcrum for lever 24 after a predetermined movement of connecting rod 27 is allowed during disengagement of the clutch. A cushioning spring 38 is positioned between stop 36 and shoulder 37 which also assists in returning the rod to its normal position when the clutch is re-engaged.

When the clutch is in engaged position, as shown in Figure 1, the operating cam 21 of the valve mechanism will be in a position wherein the cage will be held by cam 21 at the right end of chamber 9, thus disengaging the valve seat 18 from the chamber wall and permitting fluid under pressure to freely flow to or from the fluid motor 4 upon actuation or release of the brake pedal. When the clutch pedal is depressed to disengage the clutch, initial movement of the pedal will cause lever 24 to fulcrum on its pivotal connection with link 28 and operate rod 27 due to the fact that the force necessary to operate this rod against the action of spring 38 is considerably less than that necessary to disengage the clutch against the action of springs 35. Movement of rod 27 rotates cam 21 to the position shown in Figure 2 wherein the cage will be moved to the left end of the chamber and valve seat 18 engaged with the end wall of the chamber under the action of spring 19. The movement of rod 27 will be limited by stop 36 after shoulder 37 has compressed spring 38 between it and stop 36, and when this occurs, the lower end of lever 24 will become the fulcrum point of this lever. Continued movement of the clutch pedal will now result in clutch lever 29 being moved by link 28 and clutch elements 32 and 33 separated against the action of the engaging springs 35 to thus disengage the clutch.

Under these conditions, if the vehicle is stopped on either a level or ascending roadway, ball 17 will assume a position against valve seat 18 as shown in Figure 2. If the brakes have been applied, they will be maintained in such position without pressure on the brake pedal since fluid is prevented by the ball from returning to the master cylinder. If the brakes have not been applied, they may be applied by depressing the brake pedal, thereby forcing fluid past the ball and into the brake line leading to the fluid motor of the brake assembly, and thereafter they will be maintained applied by the engagement of the ball with valve seat 18. When the clutch pedal is released to re-engage the clutch, the control valve mechanism will not be operated in any way until the surfaces between clutch plate 30 and clutch elements 32 and 33 come into contact. When this occurs, the movement of clutch operating lever 29 will cease and the action of the clutch engaging springs 35 on the clutch operating lever will decrease. As the clutch pedal continues to be moved rearwardly, the lever 24 will again fulcrum on its pivot with link 28 and rod 27 will be moved to the right to cause the cage operating cam to move the cage to the right end of the chamber and unseat valve seat 18. The fluid in fluid motor 4 will now be free to return to the master cylinder and thereby release the brakes. The release of the brakes when fluid is allowed to return is very rapid, and since rod 27 begins to move to the right as soon as the clutch elements contact, the brakes will be released by the time the clutch is fully engaged, or immediately thereafter. There will then be no serious drag of the brakes.

If the vehicle is moving along a highway and the clutch is disengaged and the brakes applied, they will not be maintained applied if the brake pedal is released because under these conditions the action of inertia resulting from deceleration of the vehicle will cause the ball to roll to the right end of the cage and permit free communication in either direction between the master cylinder and the fluid motor.

With the control valve mechanism 7 controlled by the connecting mechanism between the clutch pedal and the clutch in the manner shown and described, it is not necessary to make any adjustments as the clutch plates wear to insure that the release of the valve will occur at the proper time in relation to clutch engagement. Regardless of the amount of wear of the plates, the cage will always be moved to unseat valve 18 immediately following contact of the surfaces of the clutch plate and clutch elements 32 and 33. If the brake holding valve were directly controlled by a rod connected to the clutch pedal, as is done in prior constructions, the length of this rod would have to be adjusted at different intervals as the clutch faces wear in order that the release of the brakes would occur at the proper time during the re-engagement of the clutch. To have a proper release of the control valve during the starting of the vehicle on an ascending roadway, the release should occur just at the time the clutch is beginning to engage, or immediately thereafter. This time of release is present in the embodiment of my invention just described and it is not affected in any way by wear of the clutch plates.

Figure 3 shows a modified construction wherein the brake control valve mechanism is operated by a suction motor which is controlled by a valve in the connection between the clutch pedal and clutch in such a manner that the release of the brakes will occur just after contact with the clutch faces. The clutch pedal 23 has connected thereto a link 39 on the end of which is a valve element 40 positioned within a casing 41. The casing 41 is connected to the clutch operating lever 29 which operates the clutch mechanism already described. The chamber of the casing has a passage 42 at one end connected to a source of suction such as the manifold of the engine by a conduit 43. The end wall of the chamber surrounding passage 42 forms a valve seat 44 for the head of valve element 40, the latter being normally biased against the seat by a spring 45 interposed between the head of the valve and a closure plug 46 which also acts as a guide for connecting rod 39. The connecting rod 39 is provided with a longitudinal slot 47 for placing the interior of the casing in constant communication with the atmosphere when valve element 40 is seated. The relative movement between the casing and the valve element is limited by a shoulder 48 on the valve element engaging plug 46 and when this shoulder is in engagement with the plug, the atmospheric slot 47 is closed. The portion of the casing containing valve element 40 is connected, by means of a conduit 49, with a suction motor 50 which has its flexible diaphragm 51 connected, by means of a link 52, with the operating arm 26 of the control valve mechanism 7 carried on the end of the master cylinder. The arm 26 is normally biased by a spring 53 to a position wherein cam 21 will normally hold valve seat 18 of valve mechanism 7 off its seat.

In the operation of the structure shown in Figure 3, when the clutch pedal is initially moved to disengage the clutch, connecting rod 39 will be moved to the right thereby compressing the relatively weak spring 45, unseating valve element 40, and engaging shoulder 48 with plug 46 to close the atmospheric slot 47. The suction motor will now be operated and the cage of control valve 7 permitted to move to the left (Figure 2) to seat valve seat 18. Continued movement of the clutch pedal will result in the disengagement of the clutch by direct transmittal of power from the clutch pedal to the clutch-operated lever 29 due to the engagement of shoulder 48 with plug 46.

When the clutch pedal is released to re-engage the clutch, the clutch faces will be brought into contact under the action of clutch springs 35 whereupon spring 45 will be permitted to expand and seat valve 40. This will cut off the connection with the source of suction and allow air to enter fluid motor 50 through slot 47. The cage of control valve 7 will now be moved to a position where valve seat 18 is disengaged from the chamber wall by the action of spring 53 which is stronger than the small spring 19 acting upon the cage. It is thus seen that this modification produces the same results as the construction described in Figure 1. The brakes will always be released just after the clutch plates contact, notwithstanding the fact that these plates may wear.

In Figure 4 I have shown the clutch connecting mechanism of Figure 1 as controlling a slightly different form of control valve mechanism. This control valve mechanism comprises a casing 54 having a chamber 55 therein in communication with the master cylinder by a passage 56 and a conduit 57 and in communication with conduit 6 leading to the brake actuating motor 4 by a passage 58. The passage 56 is provided with a rubber valve seat 59 for cooperation with the ball 60 mounted on a track 61 in chamber 55. The passages 56 and 58 are also in communication with a chamber 62 which acts as a by-pass around the ball and positioned in this chamber is a piston 63 sealed by a packing cup 64. A central projecting portion 65 on the piston is adapted to cooperate with the wall surface surrounding passage 58 in order to close off communication through chamber 62. The projection is normally held out of engagement with the wall surface of spring 66. The piston 63 has a piston rod 67 extending from the casing and pivoted thereto is a floating lever 68, the central part of which is connected to clutch pedal 23 by a link 69 and the lower end of which is connected to the clutch operating lever 29 by a link 70.

In the operation of the modification shown in Figure 4, initial depression of the pedal will result in movement of lever 68 without movement of the clutch lever due to the clutch engaging springs being much stronger than spring 66. The lever 68 will thus cause piston 63 to be moved to the right and the projecting portion 65 engaged with the wall of the chamber. The lever 68 will now fulcrum at its upper end and continued movement of the clutch pedal will cause disengagement of the clutch. If the vehicle is stopped on a level or ascending roadway and the brakes have been applied, they will be held applied without holding the foot on the brake pedal as the ball is against seat 59. If they have not been applied, they may be applied and held applied without holding the foot on the brake pedal as the ball will let fluid under pressure pass to the brake actuating motor but not return. If the vehicle is moving when the clutch is disengaged, the brakes will not be held applied after the release of the brake pedal as the action of inertia resulting from deceleration of the vehicle will keep the ball unseated. When the clutch pedal is released, the brakes will be released just after the clutch plates contact for then spring 65 becomes effective to move the piston to the left and permit fluid to flow through chamber 62 back to the master cylinder. The brakes are always released at the proper time in the same manner as in the other constructions already described.

This particular type of control valve mechanism and its operation by the connecting mechanism between the clutch pedal and the clutch also permits the projecting portion 65, which shuts off communication between chamber 62 and passage 58, to act as a pressure relief valve and thus limit the pressure which can be maintained in the conduits and fluid motors of the braking system. When the clutch is disengaged, the pressure with which projection 65 engages the wall surface is dependent upon the force exerted by clutch springs 35 and the ratio of the arms of lever 68. The pressure can thus be varied by changing the point of connection of rod 69 to lever 68. If it is desired, for example, to maintain only one hundred pounds of pressure in the brake lines and the fluid motors when the brakes are held applied, then the arms of lever 68 are proportioned so that this one hundred pounds of pressure will be sufficient to move the piston projection 65 to the left and against the action of the clutch engaging springs 35.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with clutch mechanism comprising a shiftable element and means tending to maintain said element in clutch-engaged position and with braking mechanism and means operable to hold the brakes in applied position, a control element for the brake holding means, a control element for the clutch, an operator-operated part, and actuating means for transmitting force from said part to the control element of the clutch, said means comprising relatively movable parts one of which is connected to actuate the control element of the brake holding means.

2. In a motor vehicle provided with clutch mechanism comprising a shiftable element and means tending to maintain said element in clutch-engaged position and with braking mechanism and means operable to hold the brakes in applied position, a control element for the brake holding means, a control element for the clutch, an operator-operated part, actuating means for transmitting force from said part to the control element of the clutch, said means comprising relatively movable parts one of which is connected to actuate the control element of the brake holding means, and means limiting the extent of relative movement of said relatively movable parts.

3. In a motor vehicle provided with braking mechanism and means associated therewith for holding the brakes in applied position and with a clutch mechanism comprising a shiftable element and means tending to maintain said element in clutch-engaged position, a single operating element for actuating both the shiftable clutch element and the brake holding means, and means connecting said operating element to said devices and comprising a common force transmitting part so connected to the operating element and to said devices that the actuation of the brake holding means to operating position applies pressure to the shiftable clutch element in clutch disengaging direction.

4. In a motor vehicle provided with braking mechanism and means associated therewith for holding the brakes in applied position and with a clutch mechanism comprising a shiftable element and means tending to maintain said element in clutch-engaged position, a single operating element for actuating both the shiftable clutch element and the brake holding means, means connecting said operating element to said devices and comprising a common force transmitting part so connected to the operating element and to said devices that the actuation of the brake holding means to operating position applies pressure to the shiftable clutch element in clutch disengaging direction, and a stop acting as a fulcrum for moving the clutch element to disengaged position after the brake holding means has been brought to operating position.

5. In a motor vehicle provided with braking mechanism and with clutch mechanism having a shiftable element and means tending to maintain same in clutch-engaged position, means associated with the braking mechanism for holding the brakes in applied position, said means being biased to inoperative position, actuating means, and connections between said actuating means, the shiftable clutch element and the brake release preventing means whereby said brake release preventing means will be moved to an operative position only when the actuating means is operated to apply pressure to the shiftable clutch element in clutch disengaging direction, said connections comprising elements capable of relative movement, one of said elements being common to the connection between the actuating means and the clutch element and to the connection between the actuating means and the brake release preventing means.

6. In a motor vehicle provided with a fluid braking mechanism having a source of pressure, a brake unit and a conduit therebetween and with a clutch mechanism having a shiftable element and means tending to maintain same in clutch-engaged position, a valve associated with the conduit for preventing release of the brakes from applied position, said means being biased to inoperative position, actuating means, and connections between the actuating means, the shiftable clutch element and the valve whereby said valve will be moved to an operative position only when the actuating means is operated to apply pressure to the shiftable clutch element in clutch disengaging direction, said connections comprising elements capable of relative movement, one of said elements being common to the connection between the actuating means and the clutch element and to the connection between the actuating means and the valve.

7. In a motor vehicle provided with braking mechanism and with clutch mechanism having fixed and movable elements normally biased to engaged position, means associated with the braking mechanism for preventing release of the brakes from applied position, actuating means, and connections between the actuating means, the movable clutch element and the brake release preventing means whereby said brake release preventing means will be moved to an operative position when the actuating means is operated to disengage the clutch and to an inoperative position after the clutch elements have contacted during reengagement of the clutch and the disengaging pressure is insufficient to prevent driving engagement of the elements, said connections comprising elements capable of relative movement, one of said elements being common to the connection between the actuating means and the clutch element and to the connection between the actuating means and the brake release preventing means.

8. In a motor vehicle provided with a fluid braking mechanism having a source of pressure, a brake unit and a conduit therebetween and with a clutch mechanism having fixed and movable elements normally biased to engaged position, a valve associated with the conduit for preventing release of the brakes from applied position, actuating means, and connections between the actuating means, the movable clutch element and the valve whereby said valve will be caused to be moved to an operative position when the actuating means is operated to disengage the clutch and to an inoperative position after the clutch elements have contacted during re-engagement of the clutch and the disengaging pressure is insufficient to prevent driving engagement of the elements, said connections comprising elements capable of relative movement, one of said elements being common to the connection between the actuating means and the clutch element and to the connection between the actuating means and the valve.

9. In a motor vehicle provided with braking mechanism and with clutch mechanism having engageable elements, means connected to disengage and permit re-engagement of the elements of said clutch mechanism, said connection embodying two elements capable of relative movement, means associated with the braking mechanism for preventing release of the brakes from an applied position, and means governed by said relative movement for controlling said release preventing means.

10. In a motor vehicle provided with braking mechanism and with clutch mechanism having engageable elements, means connected to disengage and permit re-engagement of the elements of said clutch mechanism, said connection embodying two elements capable of relative movement, means associated with the braking mechanism for preventing release of the brakes from an applied position, power-operated means for controlling said release preventing means, and means governed by said relative movement for governing the operation of said power means.

11. In a motor vehicle provided with clutch mechanism having engageable elements and with a fluid-actuated brake assembly and a source of fluid pressure connected to actuate the brake, means embodying a valve for preventing return flow of fluid from the brake assembly, means for engaging and disengaging the elements of the clutch, said means embodying a connection having two elements capable of relative movement prior to the disengagement of the clutch elements by said means and after contact of the clutch element during re-engagement, and means governed by said relative movement for controlling the valve, said valve being closed when the clutch elements are disengaged and open when the clutch elements are in driving relation.

12. In a motor vehicle provided with braking mechanism and with clutch mechanism having engageable elements, actuating means connected to disengage and permit re-engagement of the elements of said clutch mechanism, said connection embodying two elements capable of relative movement, means associated with the braking mechanism for preventing release of the brakes from an applied position, a fluid-operated motor for actuating the release preventing means, a valve for governing the operation of the fluid motor, and means for controlling said valve by the relative movement of the two elements of said connection when said actuating means disengages and permits re-engagement of the clutch.

13. In a motor vehicle provided with clutch mechanism having engageable elements and with a fluid-actuated brake assembly and a source of fluid pressure connected to actuate the brake, means embodying a valve for preventing return flow of fluid from the brake assembly, means for engaging and disengaging the elements of the clutch, said means embodying a connection having two elements capable of relative movement prior to the disengagement of the clutch elements by said means and after contact of the clutch element during re-engagement, power means for controlling said valve, and means governed by said relative movement for governing the operaton of said power means, said power means being operable to close said valve when the clutch elements are disengaged and inoperable when the clutch elements are in driving relation.

14. In a motor vehicle provided with braking mechanism and with clutch mechanism having engageable elements, means associated with the braking mechanism for preventing release of the brakes from an applied position, a clutch pedal, a floating lever having one end connected to the clutch pedal, the other end to the brake release preventing means and the intermediate portion to the clutch, and means whereby when the clutch pedal is operated to disengage the clutch the lever will cause the brake release preventing means to be operative prior to disengagement of the clutch and when the brake pedal is released to re-engage the clutch the lever will cause the release preventing means to be inoperative after the elements of the clutch have contacted.

15. In a motor vehicle provided with a fluid braking mechanism having a source of pressure connected to a braking unit and with a clutch having engageable elements and a clutch engaging spring, means associated with the braking mechanism for preventing release of the brakes from applied position and comprising a valve for preventing return flow of fluid from the braking unit and adapted to move off its seat in a direction away from the brake unit, a clutch actuator, and a connection between the clutch actuator, the clutch and the valve whereby the valve is first seated and then the clutch disengaged when the clutch actuator is operated, said connection comprising a lever which is so arranged that the reaction of the clutch spring when the clutch is disengaged will be effective to maintain the valve seated under a predetermined pressure to thereby limit the fluid pressure which may be maintained in the brake unit.

16. In a motor vehicle provided with a fluid braking mechanism having a source of pressure connected to a braking unit and with a clutch having engageable elements and a clutch engaging spring, means associated with the braking mechanism for preventing release of the brakes from applied position and comprising a valve for preventing return flow of fluid from the braking unit and adapted to be moved off its seat in a direction away from the brake unit, a clutch actuator, and a connection between the clutch actuator and the clutch for disengaging the clutch and permitting its re-engagement, said connection comprising a floating lever connected to the actuator, to the clutch and to the valve and adapted to close said valve upon initial operation of the actuator to disengage the clutch, said lever being so connected to the valve, clutch and actuator that the clutch engaging spring when the clutch is disengaged will maintain said valve seated under a predetermined pressure to thereby limit the pressure which may be maintained in the brake unit.

17. In a motor vehicle provided with a fluid braking mechanism having a source of pressure connected to a braking unit and with a clutch mechanism having engageable elements and a clutch engaging spring, said connection between the source of pressure and the braking unit embodying two passages each of which is capable of conveying fluid to the braking unit, valve means governed by the action of gravity and the action of inertia during deceleration of the vehicle for controlling one of said passages, a second valve for controlling the other passage and adapted to be moved off its seat in a direction away from the brake unit, a clutch actuator, and a connection between the clutch actuator and the clutch for disengaging the clutch and permitting its re-engagement, said connection comprising a floating lever connected to the actuator, to the clutch and to the second valve and adapted to close said valve upon initial operation of the actuator to disengage the clutch, said lever being so connected to the second valve, clutch and actuator that the clutch engaging spring when the clutch is disengaged will maintain said valve seated under a predetermined pressure to thereby limit the fluid pressure which may be maintained in the brake unit.

WALTER R. FREEMAN.